US007666087B2

(12) United States Patent
Hughs-Baird

(10) Patent No.: US 7,666,087 B2
(45) Date of Patent: *Feb. 23, 2010

(54) GAMING DEVICE HAVING AN INPUT-OUTPUT VALUE BONUS SCHEME

(75) Inventor: Andrea C. Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 1402 days.

This patent is subject to a terminal disclaimer.

(21) Appl. No.: 10/803,309

(22) Filed: Mar. 18, 2004

(65) Prior Publication Data

US 2004/0204218 A1 Oct. 14, 2004

Related U.S. Application Data

(63) Continuation of application No. 09/963,121, filed on Sep. 21, 2001, now Pat. No. 6,726,565.

(51) Int. Cl.
*A63F 13/00* (2006.01)

(52) U.S. Cl. ............................ 463/25; 463/20; 463/42; 273/143 R

(58) Field of Classification Search ....................... None
See application file for complete search history.

(56) References Cited

U.S. PATENT DOCUMENTS

| | | | |
|---|---|---|---|
| 4,618,150 | A | 10/1986 | Kimura |
| 4,624,459 | A | 11/1986 | Kaufman |
| 4,695,053 | A | 9/1987 | Vazquez, Jr. et al. |
| 5,205,555 | A | 4/1993 | Hamano |
| 5,536,016 | A | 7/1996 | Thompson |
| 5,769,716 | A | 6/1998 | Saffari et al. |
| 5,823,874 | A | 10/1998 | Adams |
| 5,833,538 | A | 11/1998 | Weiss |
| 5,848,932 | A | 12/1998 | Adams |
| 5,882,261 | A | 3/1999 | Adams |
| 5,927,714 | A | 7/1999 | Kaplan |
| 5,951,397 | A | 9/1999 | Dickinson |
| 6,004,207 | A | 12/1999 | Wilson, Jr. et al. |
| 6,015,346 | A | 1/2000 | Bennett |
| 6,033,307 | A | 3/2000 | Vancura |

(Continued)

FOREIGN PATENT DOCUMENTS

GB 2183882 A 6/1987

(Continued)

OTHER PUBLICATIONS

Addams Family Article (7 pages) written by Strictly Slots, published Jul. 2000.

(Continued)

*Primary Examiner*—M. Sager
(74) *Attorney, Agent, or Firm*—K&L Gates LLP

(57) ABSTRACT

A gaming device with a bonus scheme which includes at least one input value; a plurality of selections and at least one modifier associated with a selection. The gaming device enables a player to apply input values to desired selections and depending upon which modifiers are associated with the selections, the player can gain a relatively high or low output value. This type of bonus scheme adds excitement to bonus rounds and increases player entertainment.

114 Claims, 6 Drawing Sheets

U.S. PATENT DOCUMENTS

| | | | | |
|---|---|---|---|---|
| 6,062,980 | A | 5/2000 | Luciano | |
| 6,089,976 | A | 7/2000 | Schneider et al. | |
| 6,089,978 | A | 7/2000 | Adams | |
| 6,102,798 | A | 8/2000 | Bennett | |
| 6,120,031 | A | 9/2000 | Adams | |
| 6,126,542 | A | 10/2000 | Fier | |
| 6,155,925 | A | 12/2000 | Giobbi et al. | |
| 6,159,097 | A | 12/2000 | Gura | |
| 6,159,098 | A | 12/2000 | Slomiany et al. | |
| 6,168,523 | B1 | 1/2001 | Piechowiak et al. | |
| 6,174,235 | B1 | 1/2001 | Walker et al. | |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,261,177 | B1 | 7/2001 | Bennett | |
| 6,299,165 | B1 | 10/2001 | Nagano | |
| 6,309,300 | B1 | 10/2001 | Glavich | |
| 6,311,976 | B1 | 11/2001 | Yoseloff et al. | |
| 6,312,334 | B1 | 11/2001 | Yoseloff | |
| 6,315,664 | B1 | 11/2001 | Baerlocher et al. | |
| 6,319,124 | B1 | 11/2001 | Baerlocher et al. | |
| 6,328,649 | B1 | 12/2001 | Randall et al. | |
| 6,346,043 | B1 | 2/2002 | Colin et al. | |
| 6,398,218 | B1 | 6/2002 | Vancura | |
| 6,439,995 | B1 * | 8/2002 | Hughs-Baird et al. | 463/20 |
| 6,464,582 | B1 | 10/2002 | Baerlocher et al. | |
| 6,514,141 | B1 | 2/2003 | Kaminkow et al. | |
| 6,569,015 | B1 | 5/2003 | Baerlocher et al. | |
| 6,582,306 | B1 | 6/2003 | Kaminkow | |
| 6,595,854 | B2 * | 7/2003 | Hughs-Baird et al. | 463/20 |
| 6,599,185 | B1 | 7/2003 | Kaminkow et al. | |
| 6,607,438 | B2 | 8/2003 | Baerlocher et al. | |
| 6,638,164 | B2 | 10/2003 | Randall et al. | |
| 6,688,975 | B2 | 2/2004 | Baerlocher et al. | |
| 6,692,355 | B2 | 2/2004 | Baerlocher et al. | |
| 6,722,981 | B2 | 4/2004 | Kaminkow et al. | |
| 6,726,563 | B1 | 4/2004 | Baerlocher et al. | |
| 6,726,565 | B2 * | 4/2004 | Hughs-Baird | 463/25 |
| 6,796,902 | B2 | 9/2004 | Baerlocher et al. | |
| 6,811,485 | B2 | 11/2004 | Kaminkow | |
| 6,814,664 | B2 | 11/2004 | Baerlocher et al. | |
| 6,899,620 | B2 | 5/2005 | Kaminkow et al. | |
| 6,966,833 | B2 | 11/2005 | Kaminkow et al. | |
| 6,971,954 | B2 | 12/2005 | Randall et al. | |
| 7,160,188 | B2 | 1/2007 | Kaminkow et al. | |
| 7,172,506 | B2 | 2/2007 | Baerlocher et al. | |
| 7,182,689 | B2 * | 2/2007 | Hughs-Baird et al. | 463/20 |
| 7,229,350 | B2 | 6/2007 | Baerlocher et al. | |
| 7,250,001 | B2 | 7/2007 | Baerlocher et al. | |
| 7,329,179 | B2 | 2/2008 | Baerlocher | |
| 7,338,364 | B2 | 3/2008 | Baerlocher et al. | |
| 7,361,088 | B2 | 4/2008 | Maya et al. | |
| 7,371,174 | B2 | 5/2008 | Baerlocher | |
| 7,377,849 | B2 | 5/2008 | Baerlocher et al. | |
| 7,470,187 | B2 | 12/2008 | Baerlocher et al. | |
| 7,470,188 | B2 | 12/2008 | Baerlocher et al. | |
| 7,470,189 | B2 | 12/2008 | Baerlocher et al. | |
| 7,488,250 | B2 | 2/2009 | Baerlocher et al. | |
| 2004/0082378 | A1 | 4/2004 | Peterson et al. | |
| 2004/0171616 | A9 | 9/2004 | South et al. | |
| 2006/0025196 | A1 | 2/2006 | Webb et al. | |
| 2007/0129131 | A1 | 6/2007 | Kaminkow et al. | |
| 2007/0213119 | A1 | 9/2007 | Baerlocher et al. | |
| 2008/0113759 | A1 | 5/2008 | Baerlocher | |
| 2008/0214272 | A1 | 9/2008 | Baerlocher et al. | |

FOREIGN PATENT DOCUMENTS

| | | | |
|---|---|---|---|
| GB | 2222712 | A | 3/1990 |

OTHER PUBLICATIONS

Double Up Poker Game Description (1 page) written by IGT, published prior to 2001.

Five Card Instant Bingo Brochure (1 page) written by IGT, published in 2000.

Fortune Hunter Brochure (2 pages) written by Aristocrat, published in 1995.

Heads & Tails Brochure (2 pages) written by A. C. Coin & Slot, published prior to 2001.

Marilyn Monroe Brochure (1 page) written by IGT, published in 2001.

Polly & Roger Brochure (2 pages) written by Anchor Games, published in 2000.

Party Time Razzle Dazzle Brochure (2 pages) written by IGT, published in 1999.

Smiling APE Advertisement (4 pages) written by IGT, published prior to 2001.

Take Your Pick Article (1 page) written by Strictly Slots, published in Mar. 2001.

Take Your Pick Brochure (2 pages) written by IGT/Anchor Games, published in 1999.

Texas Tea Brochure (4 pages) written by IGT, published in 2000.

Top Dollar Brochure (2 pages) written by IGT, published in 1998.

Twenty One Game Description (pp. 180-183) written by Hoyle's Rules of Games, published in 1946, 1949, 1954, 1958, 1963 and 1983.

* cited by examiner

GAMING DEVICE HAVING AN INPUT-OUTPUT VALUE BONUS SCHEME

PRIORITY CLAIM

This application is a continuation application of U.S. patent application Ser. No. 09/963,121, filed on Sep. 21, 2001 now U.S. Pat. No. 6,726,565, entitled "Gaming Device Having an Input-Output Value Bonus Scheme."

CROSS REFERENCE TO RELATED APPLICATIONS

This application relates to the following co-pending commonly owned patent applications: "GAMING DEVICE HAVING A SELECTIVELY ACCESSIBLE BONUS SCHEME," Ser. No. 10/794,192; "GAMING DEVICE HAVING A SELECTIVELY ACCESSIBLE BONUS SCHEME," Ser. No. 11/748,267; "GAMING DEVICE HAVING A GAME WITH A MOVING DIGIT GENERATED OUTCOME" Ser. No. 11/222,914; "GAMING DEVICE HAVING PLAYER SELECTABLE AWARD DIGITS AND AWARD MODIFICATION OPTIONS" Ser. No. 12/117,427; "GAMING DEVICE HAVING WAGER DEPENDENT BONUS GAME PLAY," Ser. No. 12/014,354; "GAMING DEVICE HAVING A MULTIPLE SELECTION AND AWARD DISTRIBUTION BONUS SCHEME," Ser. No. 11/620,381.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which has a bonus scheme which involves applying one or more input values to one or more selections and receiving one or more output values in return.

BACKGROUND OF THE INVENTION

Many existing gaming machines, such as traditional slot machines, include bonus rounds. Typically, a bonus round begins when the player reaches a bonus triggering event in the primary game of the gaming device. In slot machines with reels, the triggering event usually occurs when the player reaches a predetermined combination of symbols on the reels. The bonus scheme generally provides the player with an opportunity to gain a bonus value before the bonus round terminates.

Some bonus schemes enable a player to choose from a plurality of selections. Each selection is associated with a value. Depending upon which choice a player makes, the player will receive a relatively high, low or no value at all.

To increase player enjoyment and excitement, it is desirable to provide players with new bonus schemes for gaming devices which enable players to apply certain input values to desired selections, resulting in output values.

SUMMARY OF THE INVENTION

The present invention provides a gaming device which includes a plurality of selections and one or more input values. An input value, at times referred to herein as a "starting value" includes any input or starting bonus value which a player can relate to or apply to a selection or symbol. When a player is described herein in terms of "relating" a value to a location, this includes the player associating a value with a location. One or more, and preferably all, of the selections are associated with a modifier. A selection, which is preferably a symbol, can be a representation of any person, place or thing. The term modifier, as used herein, includes one or more numerical multiplication factors, addition factors or subtraction factors (including zero, the number one and all other numbers in fractional, whole or decimal form) and any game, award opportunity or event. When a modifier is applied to an input value, the result is an output value. An output value, at times referred to herein as an "ending value," is the mathematical result of a modifier being applied to an input value. In other words, the gaming device processor uses the numerical modifier to mathematically change the starting value or starting bonus value to an ending value or ending bonus value. For example, the gaming device may provide the player with an input value or starting value of ten. If the modifier of this input value or starting value is an addition factor of five, the output value or ending value would be fifteen. Generally, in operation the player applies one or more input values or starting values to one or more selections or symbols. The numerical modifiers associated with certain selections or symbols determine the output values or ending values for each selection or symbol. As an award, the player receives the total output value or ending value, which is the sum of the output values or ending values for each selection or symbol.

In one embodiment, the gaming device displays the selections to the player while masking or not revealing the associated modifiers. The gaming device enables the player to apply various input values to the selections on a one-by-one basis. Here, it is preferable that the player can only choose one selection one time for any one input value. When the player applies an input value to a particular selection, the gaming device reveals the modifier associated with that selection. Preferably, the gaming device also reveals the output value associated with that selection. When the player completes applying all of the input values, the gaming device awards the player with the sum of the output values for all of the selections.

In an alternative embodiment, the gaming device enables the player to apply more than one input value to a single selection. When a player does so, the gaming device preferably displays on the selection itself a current listing of the input values applied to that particular selection. In this embodiment, the gaming device does not display the modifiers associated with the selections until the player has applied all of the input values to the selections.

In another embodiment, the gaming device provides the player with one input value and a plurality of selections and associated modifiers. The gaming device enables the player to apply incremental portions of the input value to desired selections. The player continues to make selections until the input value is depleted. For example, the gaming device may provide the player with a starting bonus amount of one hundred and enable the player to apply this one hundred value or amount in increments or portions of ten. The player thus applies or relates starting bonus amount portions to symbols on multiple occasions. After the player completes applying the entire starting bonus amount, the gaming device preferably displays the ending bonus amount portions associated with each symbol. The gaming device can display the total ending bonus amount instead of or in addition to the separate ending bonus amount portions.

In one embodiment, the bonus scheme of the present invention is used to imitate the workings of financial investment, risk and return. The gaming device displays the input values as bills and the selections as investment opportunities such as real estate. The total output value mimics the player's return on investments.

The bonus scheme of the present invention thus enables the player to apply one or more input bonus values to a plurality of selections. Each selection is associated with a modifier, such as a multiplication factor of two or one-half. Depending upon which selections the player makes, the player can obtain a relatively high or relatively low total bonus output. This type of bonus scheme provides players with increased entertainment and enjoyment.

It is therefore an advantage of the present invention to provide a gaming device having a bonus scheme with an input-output value bonus scheme.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
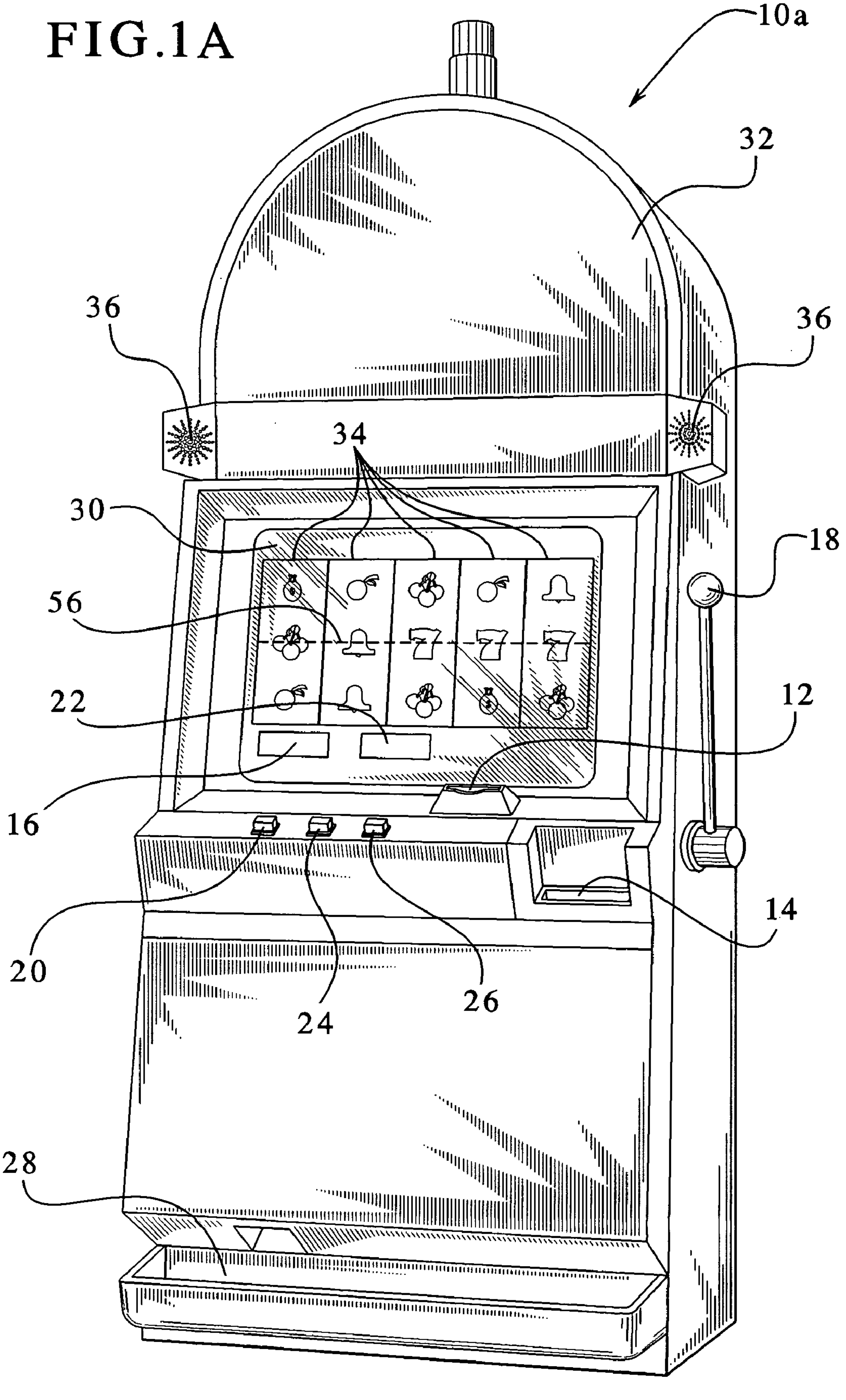
FIG. 1A is a perspective view of one embodiment of the gaming device of the present invention.
Figure 1B:
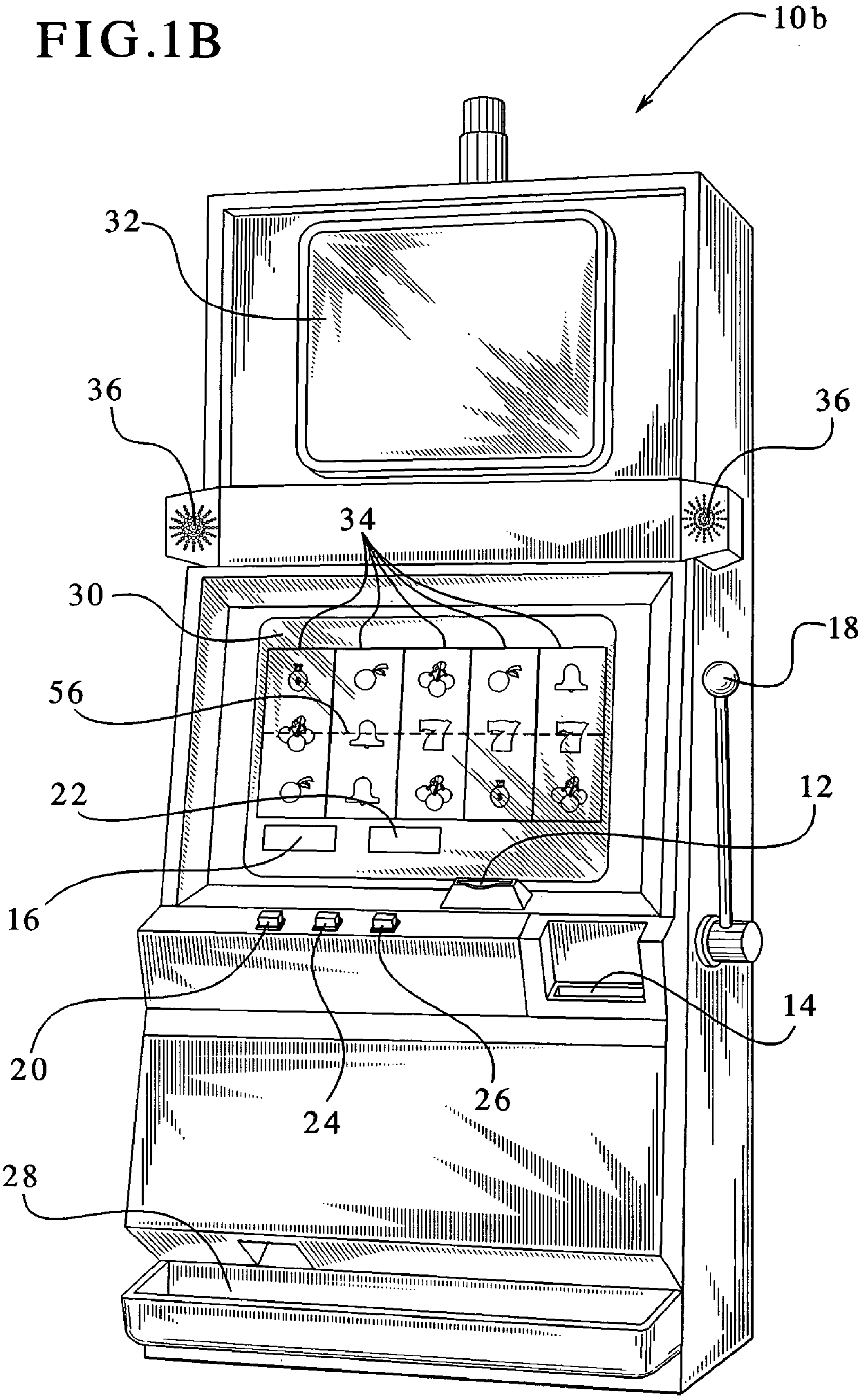
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
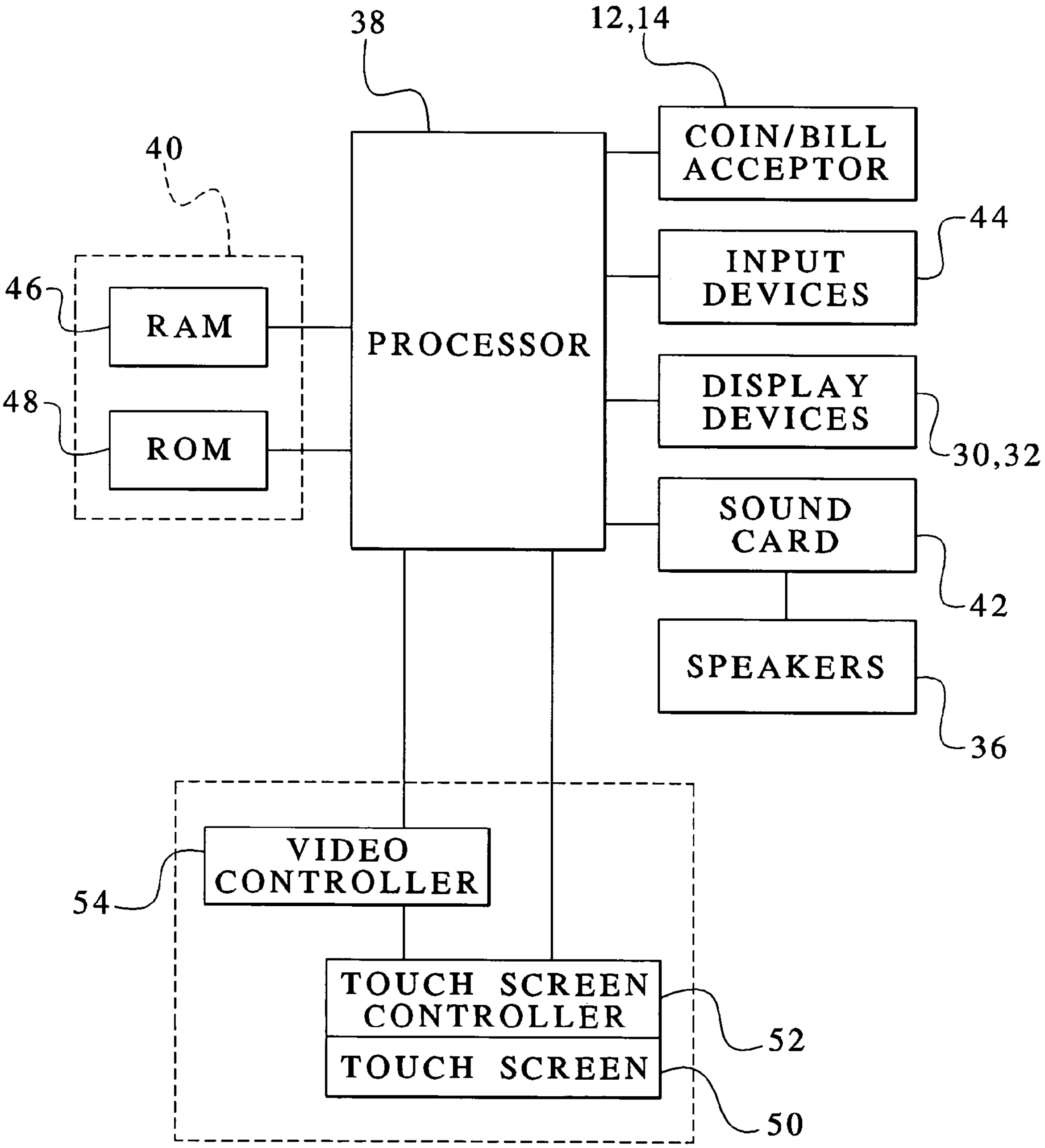
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data, graphical data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Scheme

If a player achieves a bonus triggering or qualifying condition while playing the game, the gaming device 10 automatically initiates the bonus round of the present invention. In one embodiment, the bonus scheme of the present invention includes one or more input values or starting values, a plurality of selections or symbols and a numerical modifier associated with one or more, and preferably all, of the selections or symbols. The gaming device enables the player to apply or relate the input values to desired selections. Before the player applies an input value to a selection, the gaming device masks or does not reveal the modifier associated with that selection. When a player applies an input value to a selection, the gaming device, in turn, applies the modifier associated with that selection to the input value. The gaming device then provides the player with an output value or ending value which is the mathematical result of applying the modifier.

Figure 3:
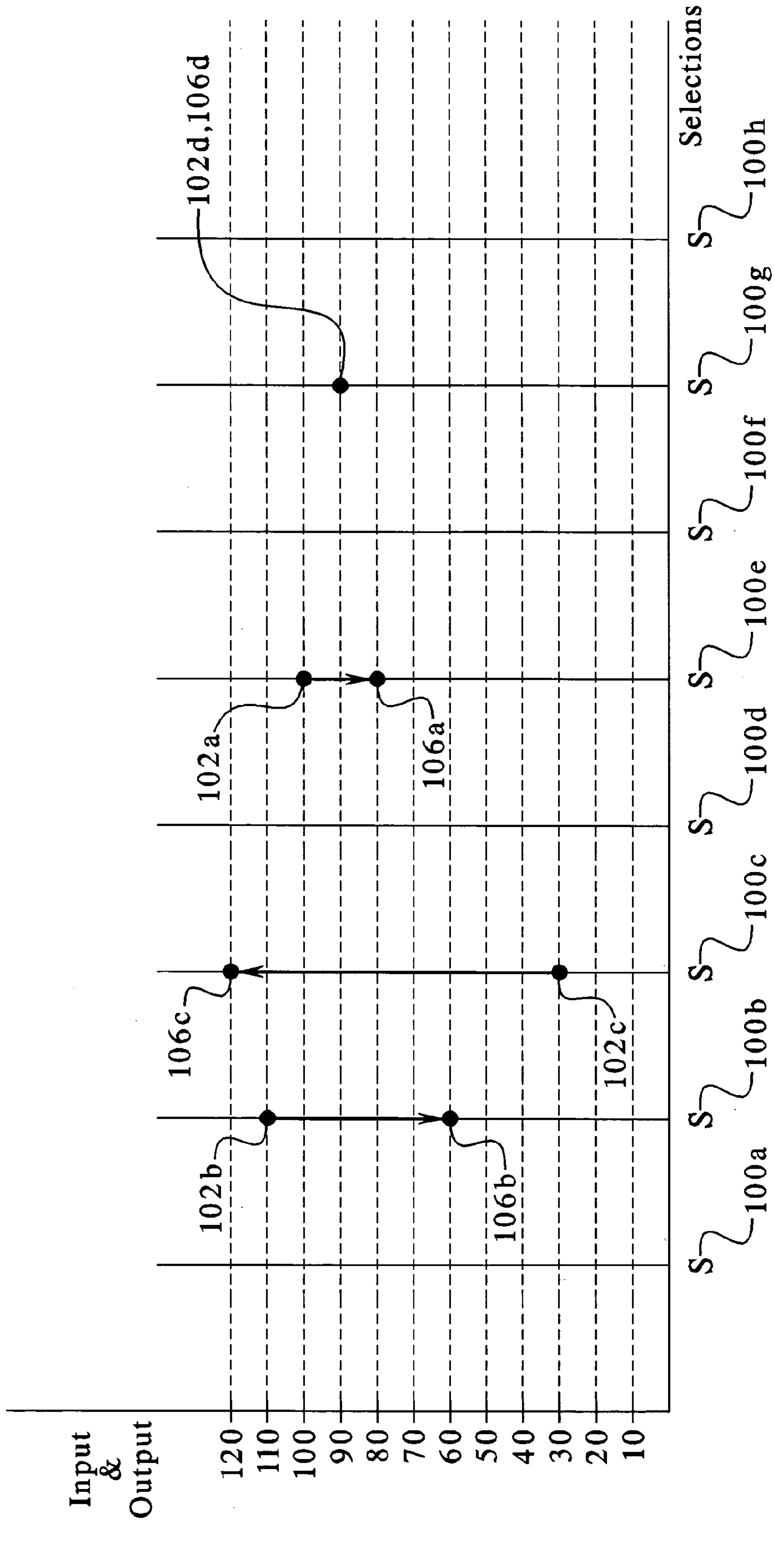
FIG. 3 is a graph of input values, output values and selections in one embodiment of the present invention.

As illustrated in FIG. 3, the gaming device can involve any number of selections 100, such as selections 100*a* through 100*h*. Here, the gaming device provides the player with four input values, specifically input values 102*a* through 102*d*. In this example, the player initially applied or related input value or starting value in the amount of one hundred 102*a* to selection 100*e*. The numerical modifier (not shown) associated with selection 100*e* decreased input 102*a* from the initial value of one hundred to a final value of eighty. Eighty is the output value or ending value 106*a*. Next, the gaming device provided the player with input value or starting value 102*b* in the amount of one hundred ten. When the player applied this input value or starting value 102*b* to selection 100*b*, the numerical modifier (not shown) associated with selection 100*b* decreased the input value or starting value to sixty. Therefore, the player's output value or ending value 106*b* is sixty. Next, the gaming device provided the player with input value or starting value 102*c* in the amount of thirty. When the player applied this input value or starting value 102*c* to selection 100*c*, the associated modifier (not shown) increased the input value or starting value 102*c* to the output value or ending value 106*c* an amount of one hundred twenty. A player can select a symbol by touching the touch screen at the location of a symbol or selecting a symbol using a predetermined indicator and a button. Preferably, the player relates an input value to a selection by selecting a symbol when a particular input value is highlighted or otherwise indicated.

If a modifier 104 is not associated with a selection, or if the modifier does not change the input value or starting value, the gaming device provides the player with an output value or ending value equal to the input value or starting value, as indicated by the identical input value or starting value 102*d* and output value or ending value 106*d* shown at selection 10*g* in FIG. 3. In this example, the player started the bonus round with a total input value or starting value of three hundred thirty and ended the bonus round with a total output value or ending value of three hundred fifty.

Figure 4B:
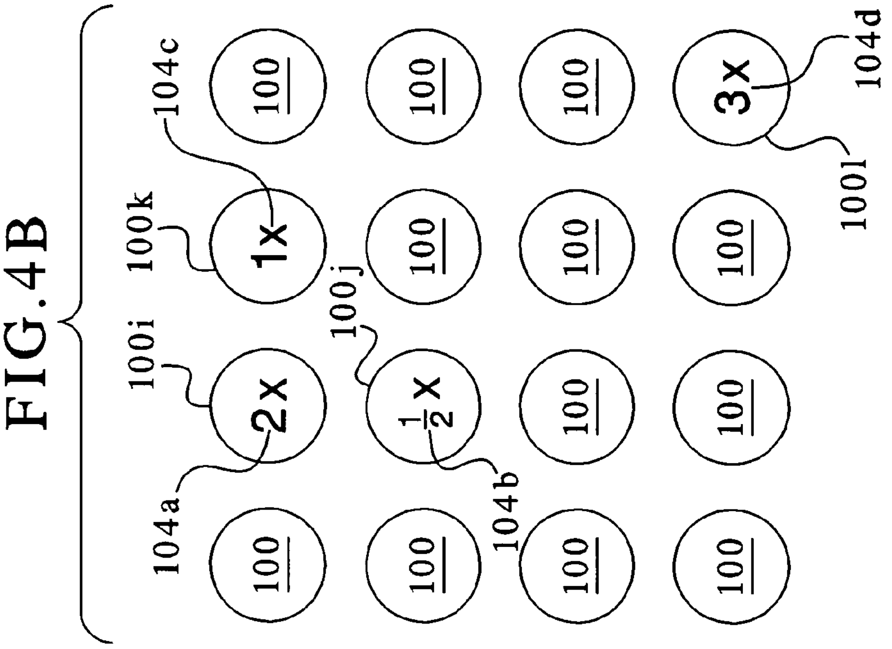
FIGS. 4A and 4B are top plan views of an example of input values, output values and selections in one embodiment of the present invention.
Figure 4A:
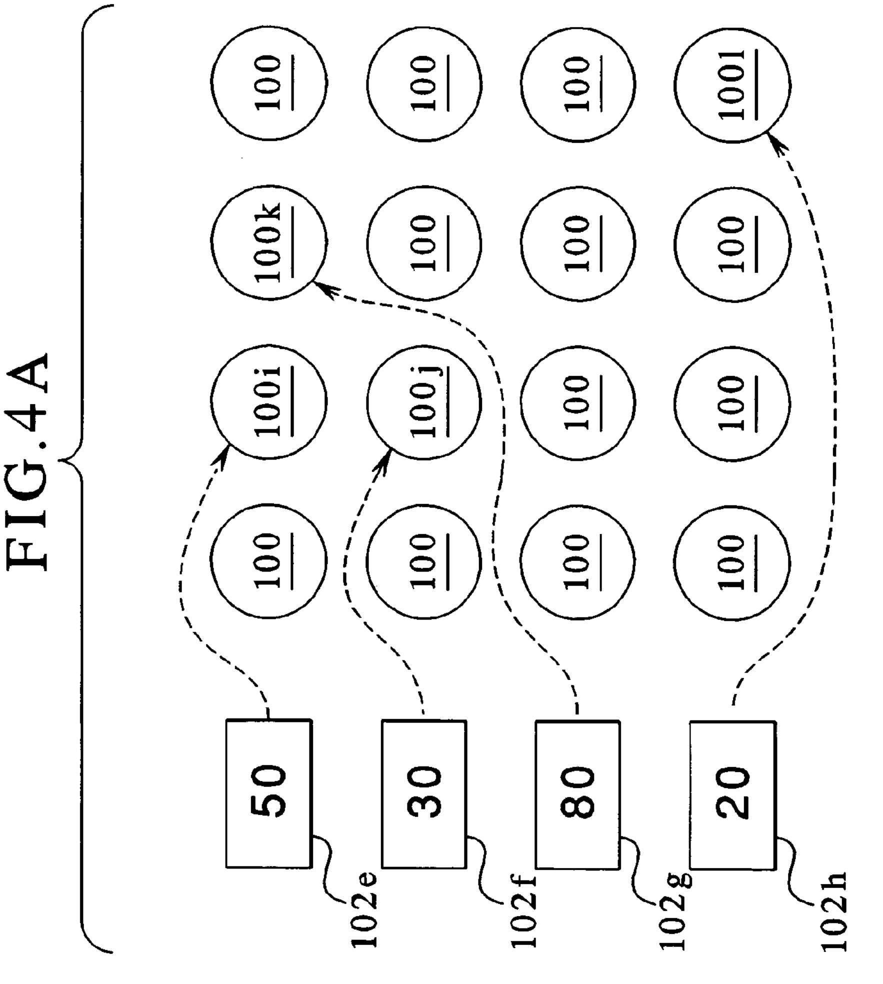

In a preferred embodiment illustrated in FIGS. 4A and 4B, the gaming device displays a plurality of selections 100 to the player, as well as a plurality of input values 102 to the player. In this example, the gaming device displays input values 102*e* through 102*h* to the player. Here, the total input value is one hundred eighty, and the gaming device provides this amount to the player in the form of the input value 102*e* of fifty, input value 102*f* of thirty, input value 102*g* of eighty and input value 102*h* of twenty. The gaming device also includes a predetermined number of modifiers, one or more of which can be used to modify an input value for a particular selection. In this example, the modifiers are multiplication factors where modifier 104*a* is two, modifier 104*b* is one-half, modifier 104*c* is one and modifier 104*d* is three. As illustrated in FIG. 4A, the player applied input value 102*e* to selection 100*i*, input value 102*f* to selection 100*j*, input value 102*g* to selection 100*k* and input value 102*h* to selection 100*l*.

Preferably, before the player made the selections, the gaming device displayed one or more graphical images on the selections 100. In an investment-theme embodiment, these images relate to investment opportunities, such as real estate, oil or gold. Also in this preferred embodiment, the gaming device displays the input values as monetary bills.

Regardless of the particular graphics displayed, it is preferable that each time a player applies or relates an input value to a selection, the gaming device then reveals the modifier associated with that selection. However, it should be appreciated that the gaming device can continue to mask the modifiers until the player applies all of the input values to the selections. In the example shown in the FIGS. 4A and 4B, modifier 104*a* increased input value 102*e* from fifty to one hundred; modifier 104*b* decreased input value 102*f* from thirty to fifteen; modifier 104*c* did not change input value 102*g* at all; and modifier 104*d* increased input value 102*h* from twenty to sixty. The result is a total output value of two hundred fifty five. Here the player began with a total input value of one hundred eighty and obtained an increase of seventy five in value.

In this embodiment, it is preferable that the gaming device removes the images of the input values as players apply them to selections. Also, it is preferable that the gaming device reveals all modifiers which the player could have reached after the player has applied all of the input values.

Figure 5:
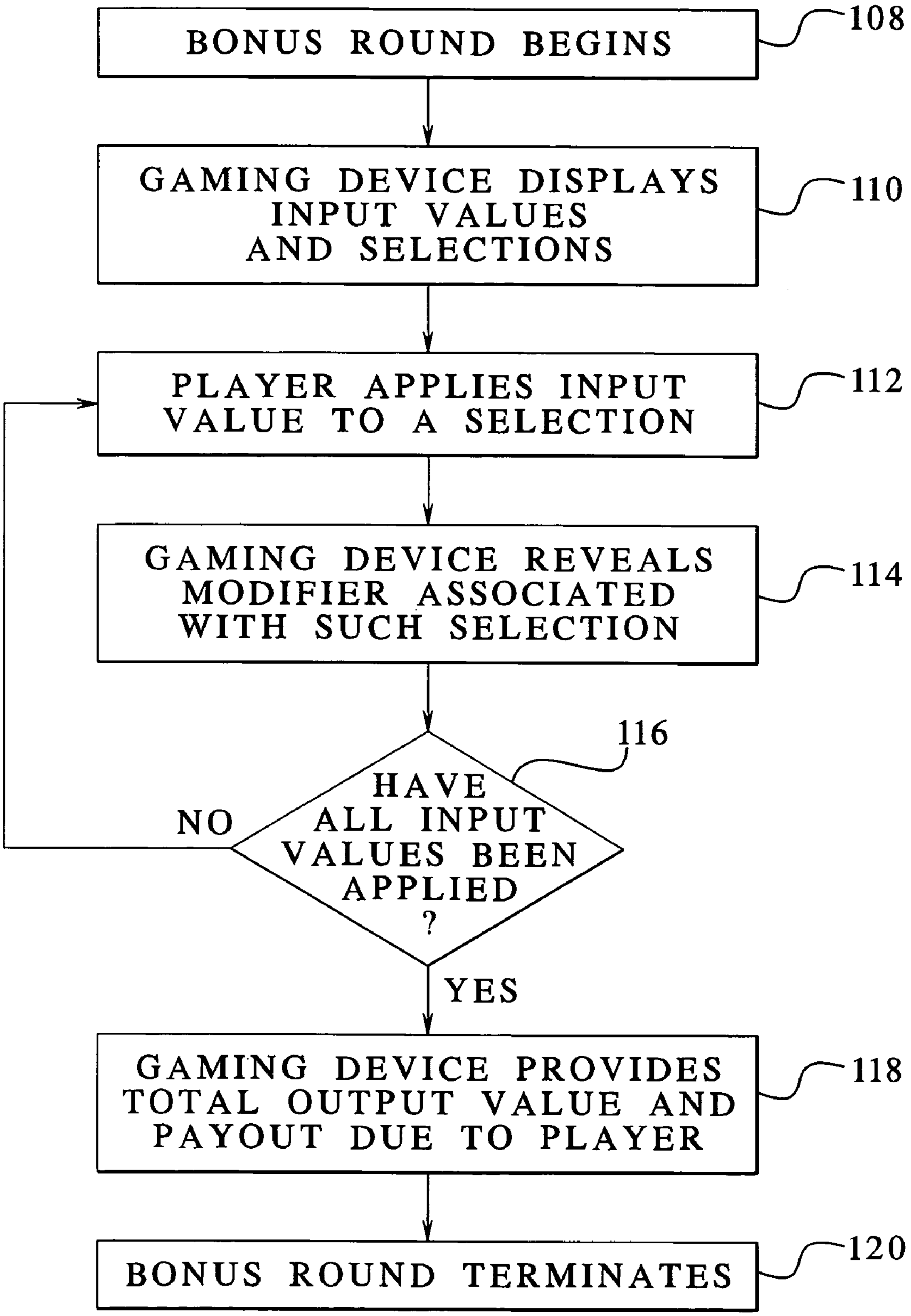
FIG. 5 is a flow diagram of one embodiment of the present invention.

With reference to FIG. 5, in operation, once the bonus round begins, the gaming device displays the input values and selections to the player, as indicated by blocks 108 and 110. The player then applies an input value to a selection, as indicated by block 112, and the gaming device preferably then reveals the modifier associated with such selection as indicated by block 114. This process continues until the player has applied all of the provided input values to selections, as indicated by diamond 116 and block 112. Once all the input values have been applied, the gaming device provides the player with a total output value and the corresponding payout due to the player, as indicated by block 118. The bonus round then terminates, as indicated by block 120.

In an alternative embodiment of the present invention, the gaming device provides the player with a single input value and enables the player to apply predetermined increments or portions of this input value to the selections. For instance, the player could apply an input value of one hundred in increments of five. Furthermore, it is preferable that the gaming device displays one or more graphical representations or images which represent a decrease in the amount of the input value as the player applies portions of the input value to selections.

In another alternative embodiment of the present invention, the gaming device enables the player to apply more than one input value to a single selection. When a player does so, the gaming device preferably displays on or adjacent to the selection itself a current listing of the input values applied to that particular selection. In this embodiment, the gaming device does not display the modifiers associated with the selections until the player has applied all of the input values to the selections or at least all of the input values the game allows the player to associate with a selection. This embodiment enables the player to take a risk that one selection may include a more valuable modifier such as a high multiplier.

In a further alternative embodiment of the present invention, the gaming device could enable the player to forfeit input values for revealing modifiers associated with certain selections. For example, the gaming device could provide a player with input values ten, twenty and thirty, and with a column of five selections. The player can discover the modifier associated with the top selection by forfeiting or giving up an input value (i.e., ten). The gaming device may then reveal a multiplier of four as the modifier. The player could then apply the twenty and thirty input values to the top selection, resulting in a total output of two hundred.

It should be appreciated that in any embodiment, the gaming device could enable the player to keep some or all of the input values, especially if the gaming device includes modifiers which substantially decrease the input value associated with the selections. Therefore, the player does not have to risk some or all of the input values. It should also be appreciated that all of the input values could be the same, could be different, could sequentially increase or decrease, could be predetermined, or could be randomly determined.

Furthermore, any of the foregoing embodiments can be adapted to require the player to provide the input values or part of the input values. In such case, each input value applied to a selection would put some credits or wager of the player at risk.

In one embodiment, the bonus scheme includes a bonus fund of bonus credits. The gaming device preferably displays the bonus fund to the player, though the gaming device can inform the player of the bonus fund through sound. Using an input device, the player can relate all of the bonus fund or certain portions of the bonus fund to certain investment-related symbols. Investment-related symbols are symbols which graphically describe or illustrate one or more characteristics of investments. For example, an investment-related symbol could be a block of gold or certificate of stock in a consumer products company corporation. If a player relates a portion of the bonus fund to a particular investment-related symbol, the gaming device processor uses the numerical modifier associated with such symbol to provide the player with an investment return bonus value. This process may repeat itself on one or more occasion until a bonus round termination event occurs. The gaming device will then award the player with all gained return bonus values and terminate the bonus round.

The bonus scheme of the present invention therefore enables players to apply one or more input values or input bonus values to desired selections included in a plurality of selections. One or more, and preferably all of the selections, are associated with modifiers. Depending upon which input value or input bonus value a player applies to which modifier, the player can gain a relatively low or relatively high output value or output bonus value. This type of bonus scheme increases the entertainment and enjoyment experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A gaming device comprising:

at least one input device;

a display device;

a processor; and at least one memory device which stores a plurality of instructions, which when executed by the processor, cause the processor to operate with the display device and the at least one input device to control a play of a game by:

(a) initially displaying:

(i) a plurality of starting values to a player, each of said plurality of starting values being greater than zero, and at least two of said plurality of starting values being different; and (ii) a plurality of selections, at least one of the selections being associated with at least one numerical modifier;

(b) thereafter:

(i) causing one of the displayed selections to be picked; and (ii) enabling the player to individually associate one of said displayed starting values with said picked selection;

(c) forming an ending value based on said individually associated starting value and any numerical modifier associated with said picked selection;

(d) repeating steps (b) to (c) for at least another one of said remaining unassociated starting values; and (e) providing the player an award based on at least two of said ending values.

2. The gaming device of claim 1, wherein when executed by the processor, the plurality of instructions cause said processor to operate with the at least one input device to control the play of the game by enabling the player to pick said selections.

3. The gaming device of claim 1, wherein when executed by the processor, the plurality of instructions cause said processor to operate with the at least one input device to control the play of the game by, for each of the selections, enabling the player to pick said selection by individually associating one of said starting values with said selection.

4. The gaming device of claim 1, wherein when executed by the processor, the plurality of instructions cause said processor to control the play of the game by repeating steps (b) to (c) for each of a plurality of said remaining unassociated starting values.

5. The gaming device of claim 1, wherein when executed by the processor, the plurality of instructions cause said processor to control the play of the game by repeating steps (b) to (c) for each of said remaining unassociated starting values.

6. The gaming device of claim 1, wherein when executed by the processor, the plurality of instructions cause said to control the play of the game by providing the player an award based on each of said ending values.

7. The gaming device of claim 1, wherein a plurality of said selections are associated with a plurality of numerical modifiers.

8. The gaming device of claim 7, wherein a plurality of said numerical modifiers are different.

9. A gaming device comprising:

at least one input device;

a display device;

a processor; and at least one memory device which stores a plurality of instructions, which when executed by the processor, cause the processor to operate with the display device and the at least one input device to control a play of a name by:

(a) initially displaying:

(i) a plurality of starting values to a player, each of said plurality of starting values being greater than zero, and at least two of said plurality of starting values being different; and (ii) a plurality of selections, for each one of the selections, a separate one of a plurality of numerical modifiers being associated with said selection;

(b) thereafter:

(i) causing one of the displayed selections to be picked:

(ii) enabling the player to individually associate one of said displayed starting values with said picked selection;

(c) forming an ending value based on said individually associated starting value and said numerical modifier associated with said picked selection;

(d) repeating steps (b) to (c) for at least another one of said remaining unassociated starting values; and (e) providing the player an award based on at least two of said ending values.

10. The gaming device of claim 9, wherein when executed by the processor, the plurality of instructions cause said processor to operate with the at least one input device to control the play of the game by enabling the player to pick said selections.

11. The gaming device of claim 9, wherein when executed by the processor, the plurality of instructions cause said processor to operate with the at least one input device to control the play of the game by, for each of the selections, enabling the player to pick said selection by individually associating one of said starting values with said selection.

12. The gaming device of claim 9, wherein when executed by the processor, the plurality of instructions cause said processor to control the play of the game by repeating steps (b) to (c) for each of a plurality of said remaining unassociated starting values.

13. The gaming device of claim 9, wherein when executed by the processor, the plurality of instructions cause said processor to control the play of the game by repeating steps (b) to (c) for each of said remaining unassociated starting values.

14. The gaming device of claim 9, wherein a plurality of said numerical modifiers are different.

15. A gaming device comprising:

at least one input device;

a display device;

a processor;

at least one memory device which stores a plurality of instructions, which when executed by the processor, cause the processor to operate with the display device and the at least one input device to control a play of a game by:

(a) initially displaying:

(i) a plurality of starting values to a player, each of said starting values being greater than zero, and at least two of said starting values being different; and (ii) a plurality of selections, a plurality of numerical modifiers being associated with a plurality of said selection;

(b) thereafter:

(i) enabling the player to select one of said displayed plurality of starting values;

(ii) picking one of said plurality of displayed selections; and (iii) enabling the player to individually associate said selected starting value with said picked selection;

(c) forming an ending value based on said individually associated starting value and any numerical modifier associated with said picked selection;

(d) repeating steps (b) to (c) for each of said remaining provided unassociated starting values; and (e) providing the player an award based on at least two of said ending values.

16. The gaming device of claim 15, wherein when executed by the processor, the plurality of instructions cause said processor to operate with the at least one input device to control the play of the game by enabling the player to pick said selections.

17. The gaming device of claim 15, wherein a plurality of said numerical modifiers are different.

18. A gaming device comprising:

at least one input device;

a display device;

a processor; and at least one memory device which stores a plurality of instructions, which when executed by the processor, cause the processor to operate with the display device and the at least one input device to control a play of a game by:

(a) displaying:

(i) starting value to a player; and (ii) a plurality of selections, for each one of the selections, a separate one of a plurality of numerical modifiers being associated with said selection;

(b) enabling the player to divide said displayed starting value into a plurality of different starting portions, each of said different starting portions being greater than zero;

(c) causing one of the displayed selections to be picked;

(d) enabling the player to individually associate one of said starting portions with said picked selection;

(e) forming an ending portion based on said individually associated starting portion and said numerical modifier associated with said picked selection;

(f) repeating steps (c) to (e) for at least another one of said remaining unassociated starting portions; and (g) providing the player an award based on at least two of said ending portions.

19. The gaming device of claim 18, wherein when executed by the processor, the plurality of instructions cause said processor to operate with the at least one input device to control the play of the game by enabling the player to pick said selections.

20. The gaming device of claim 18, wherein when executed by the processor, the plurality of instructions cause said processor to operate with the at least one input device to control the play of the game by, for each of the selections, enabling the player to pick said selection by individually associating one of said starting portions with said selection.

21. The gaming device of claim 18, wherein when executed by the processor, the plurality of instructions cause said processor to control the play of the game by repeating steps (c) to (e) for each of a plurality of said remaining unassociated starting portions.

22. The gaming device of claim 18, wherein when executed by the processor, the plurality of instructions cause said processor to control the play of the game by repeating steps (c) to (e) for each of said remaining unassociated starting portions.

23. The gaming device of claim 18, wherein when executed by the processor, the plurality of instructions cause said processor to control the play of the game by providing the player an award based on each of said ending portions.

24. The gaming device of claim 18, wherein a plurality of said numerical modifiers are different.

25. A gaming device comprising:

at least one input device;

a display device;

a processor;

at least one memory device which stores a plurality of instructions, which when executed by the processor, cause the processor to operate with the display device and the at least one input device to control a play of a game by:

(a) displaying (i) a starting value to a player; and (ii) a plurality of said selections, for each one of the selections, a separate one of a plurality of numerical modifiers being associated with said selection;

(b) enabling the player to divide said starting value into a plurality of starting portions, each of said starting portions being greater than zero;

(c) enabling the player to select one of said displayed starting portions;

(d) picking one of a plurality of selections;

(e) enabling the player to individually associate said selected starting portion with said picked selection;

(f) forming an ending portion based on said individually associated starting portion and said numerical modifier associated with the picked selection;

(g) repeating steps (c) to (f) for at least another one of said remaining provided unassociated starting portions; and (h) providing the player an award based on at least two of said ending portions.

26. The gaming device of claim 25, wherein when executed by the processor, the plurality of instructions cause said processor to operate with the at least one input device to control the play of the game by enabling the player to pick said selections.

27. The gaming device of claim 25, wherein when executed by the processor, the plurality of instructions cause said processor to control the play of the game by repeating steps (c) to (f) for each of a plurality of said remaining provided unassociated starting portions.

28. The gaming device of claim 25, wherein when executed by the processor, the plurality of instructions cause said processor to control the play of the game by repeating steps (c) to (f) for each of said remaining provided unassociated starting portions.

29. The gaming device of claim 25, wherein a plurality of said modifiers are different.

30. A gaming device comprising:

at least one input device;

a display device;

a processor;

at least one memory device which stores a plurality of instructions, which when executed by the processor, cause the processor to operate with the display device and the at least one input device to control a play of a game by:

(a) initially displaying:

(i) a plurality of starting values to a player, each of the plurality of starting values being greater than zero, and at least two of said plurality of starting values being different; and (ii) a plurality of selections, for each one of the selections, a separate one of a plurality of numerical modifiers being associated with said selection;

(b) thereafter, enabling the player to individually associate a plurality of said starting values with a plurality of picked selections;

(c) forming a plurality of ending values, each ending value being based on one of said starting values and said numerical modifier associated with the picked selection which said starting value is individually associated with; and (d) providing the player an award based on at least two of said ending values.

31. The gaming device of claim 30, wherein when executed by the processor, the plurality of instructions cause said processor to operate with the at least one input device to control the play of the game by enabling the player to pick said plurality of selections.

32. The gaming device of claim 30, wherein when executed by the processor, the plurality of instructions cause said processor to control the play of the game by providing the player an award based on each of said ending values.

33. The gaming device of claim 30, wherein a plurality of said numerical modifiers are different.

34. A gaming device comprising:

at least one input device;

a display device;

a processor; and at least one memory device which stores a plurality of instructions, which when executed by the processor, cause the processor to operate with the display device and the at least one input device to control a play of a game by:

(a) displaying:

(i) each of a plurality of starting values to a player, each of the plurality of starting values being greater than zero; and (ii) a plurality of selections, a plurality of said selections being associated with one of a plurality of numerical modifiers (b) enabling the player to accept at least one of said plurality of starting values or to risk at least one of said starting values to obtain at least one ending value;

(c) providing the player each starting value, if any, the player accepts;

(d) for each starting value, if any, the player risks:

(i) enabling the player to individually associate said starting value with a picked selection; and (ii) forming an ending value based on said individually associated starting value and any numerical modifier associated with said picked selection; and (e) providing the player an award based on any formed ending values.

35. The gaming device of claim 34, wherein when executed by the processor, the plurality of instructions cause said processor to operate with the at least one input device to control the play of the game by enabling the player to pick said selections.

36. The gaming device of claim 34, wherein when executed by the processor, the plurality of instructions cause said processor to operate with the at least one input device to control the play of the game by, for each of the selections, enabling the player to pick said selection by individually associating one of said starting values with said selection.

37. The gaming device of claim 34, wherein when executed by the processor, the plurality of instructions cause said processor to operate with the at least one input device to control the play of the game by enabling the player to accept a plurality of said starting values or risk each of said starting values to obtain a plurality of ending values.

38. The gaming device of claim 34, wherein a plurality of said numerical modifiers are different.

39. A gaming device comprising:

at least one input device;

a display device;

a processor;

at least one memory device which stores a plurality of instructions, which when executed by the processor, cause the processor to operate with the display device and the at least one input device to control a play of a game by:

(a) displaying:

(i) a starting value to a player; and (ii) a plurality of selections, a plurality of said selections being associated with one of a plurality of numerical modifiers (b) enabling the player to divide said starting value into a plurality of starting portions, each of said starting portions being greater than zero;

(c) enabling the player to accept at least one of said plurality of starting portions or risk at least one of said starting portions to obtain at least one ending portion;

(d) providing the player each starting portion, if any, the player accepts;

(e) for each starting portion, if any, the player risks:

(i) enabling the player to individually associate said starting portion with a picked selection; and (ii) forming an ending portion based on said individually associated starting portion and any numerical modifier associated with the picked selection; and (f) providing the player an award based on any formed ending portions.

40. The gaming device of claim 39, wherein each of the plurality of starting portions is different.

41. The gaming device of claim 39, wherein when executed by the processor, the plurality of instructions cause said processor to operate with the at least one input device to control the play of the game by enabling the player to pick said selections.

42. The gaming device of claim 39, wherein when executed by the processor, the plurality of instructions cause said processor to operate with the at least one input device to control the play of the game by enabling the player to accept a plurality of said starting portions or risk each of said starting portions to obtain a plurality of ending portions.

43. The gaming device of claim 39, wherein a plurality of said numerical modifiers are different.

44. A gaming device comprising:

at least one input device;

a display device;

a processor;

at least one memory device which stores a plurality of instructions, which when executed by the processor, cause the processor to operate with the display device and the at least one input device to control a play of a name by:

(a) displaying:

(i) each of a plurality of starting values to a player, each of the plurality of starting values being greater than zero; and (ii) a plurality of selections, for each one of the selections, a separate one of a plurality of numerical modifiers being associated with said selection;

(b) enabling the player to forfeit at least one of said starting values in exchange for revealing a numerical modifier associated with at least one of the selections;

(c) for each starting value forfeited, revealing the numerical modifier associated with one of the selections;

(d) for each starting value not forfeited:

(i) enabling the player to individually associate said starting value with a selection picked from the plurality of selections, regardless of whether said numerical modifier associated with said picked selection is revealed or not; and
(ii) forming an ending value based on said individually associated starting value and any numerical modifier associated with said picked selection; and
(e) providing the player an award based on any formed ending values.

45. The gaming device of claim 44, wherein when executed by the processor, the plurality of instructions cause said processor to operate with the at least one input device to control the play of the game by enabling the player to pick said selections.

46. The gaming device of claim 44, wherein a plurality of said selections are associated with a plurality of numerical modifiers.

47. The gaming device of claim 46, wherein a plurality of said numerical modifiers are different.

48. A method of operating a gaming device including a plurality of instructions, said method comprising:
(a) causing at least one display device to initially display:
(i) each of a plurality of starting values to a player, wherein each starting value is greater than zero, and at least two of said plurality of starting values being different; and
(ii) a plurality of selections, wherein at least one of said selections is associated with at least one numerical modifier;
(b) thereafter:
(i) causing one of the displayed selections to be picked; and
(ii) enabling the player to individually associate one of said displayed starting values with said picked selection;
(c) causing at least one processor to execute the plurality of instructions to form ending value based on said individually associated starting value and any numerical modifier associated with the picked selection;
(d) repeating steps (b) to (c) for at least another one of said remaining unassociated starting values; and
(e) providing the player an award based on at least two of said ending values.

49. The method of claim 48, which includes enabling the player to pick said selections.

50. The method of claim 48, which includes for each of the selections, enabling the player to pick said selection by individually associating one of said starting values with said selection.

51. The method of claim 48, which includes repeating steps (b) to (c) for each of a plurality of said remaining unassociated starting values.

52. The method of claim 48, which includes repeating steps (b) to (c) for each of said remaining unassociated starting values.

53. The method of claim 48, which includes a plurality of said selections associated with a plurality of numerical modifiers.

54. The method of claim 53, wherein a plurality of said numerical modifiers are different.

55. The method of claim 48, wherein said steps are provided to the player through a data network.

56. The method of claim 55, wherein the data network is an internet.

57. A method of operating a gaming device including a plurality of instructions, said method comprising:
(a) causing at least one display device to display:
(i) a plurality of starting values to a player, wherein each starting value is greater than zero, and at least two of said plurality of starting values being different; and
(ii) a plurality of selections, wherein each of the selections is associated with a separate numerical modifier
(b) thereafter:
(i) causing one of the displayed selections to be picked; and
(ii) enabling the player to individually associate one of said displayed starting values with said picked selection;
(c) causing at least one processor to execute the plurality of instructions to form an ending value based on said individually associated starting value and said numerical modifier associated with the picked selection;
(d) repeating steps (b) to (c) for at least another one of said remaining unassociated starting values; and
(e) providing the player an award based on at least two of said ending values.

58. The method of claim 57, which includes enabling the player to pick said selections.

59. The method of claim 57, which includes repeating steps (b) to (c) for each of a plurality of said remaining unassociated starting values.

60. The method of claim 57, which includes repeating steps (b) to (c) for each of said remaining unassociated starting values.

61. The method of claim 57, wherein a plurality of said numerical modifiers are different.

62. The method of claim 57, wherein said steps are provided to the player through a data network.

63. The method of claim 62, wherein the data network is an internet.

64. A method of operating a gaming device including a plurality of instructions, said method comprising:
(a) causing at least one display device to initially display:
(i) a plurality of different starting values to a player, wherein each starting value is greater than zero, and at least two of said plurality of starting values being different; and
(ii) a plurality of selections, wherein a plurality of the selections are each associated with a separate modifier;
(b) thereafter:
(i) enabling the player to select one of said displayed starting values;
(ii) picking one of the plurality of selections; and
(iii) enabling the player to individually associate said picked starting value with said picked selection;
(c) causing at least one processor to execute the plurality of instructions to form an ending value based on said individually associated starting value and any modifier associated with the picked selection;
(d) repeating steps (b) to (c) for each of said remaining provided unassociated starting values; and
(e) providing the player an award based on at least two of said ending values.

65. The method of claim 64, which includes enabling the player to pick said selections.

66. The method of claim 64, wherein a plurality of said numerical modifiers are different.

67. The method of claim 64, wherein said steps are provided to the player through a data network.

68. The method of claim 67, wherein the data network is an internet.

69. A method of operating a gaming device including a plurality of instructions, said method comprising:

(a) causing at least one display device to display:
(i) a starting value to a player; and
(ii) a plurality of selections, wherein each of the selections is associated with a numerical modifier;
(b) enabling the player to divide said starting value into a plurality of different starting portions, wherein each of said different starting portions is greater than zero;
(c) causing one of the displayed selections to be picked;
(d) enabling the player to individually associate one of said starting portions with said picked selection;
(e) causing at least one processor to execute the plurality of instructions to form an ending portion based on said individually associated starting portion and said numerical modifier associated with the picked selection;
(f) repeating steps (c) to (e) for at least another one of said remaining unassociated starting portions; and
(g) providing the player an award based on at least two of said ending portions.

70. The method of claim 69, which includes enabling the player to pick said selections.

71. The method of claim 69, which includes repeating steps (c) to (e) for each of a plurality of said remaining unassociated starting portions.

72. The method of claim 69, which includes repeating steps (c) to (e) for each of said remaining unassociated starting portions.

73. The method of claim 69, wherein a plurality of said numerical modifiers are different.

74. The method of claim 69, wherein said steps are provided to the player through a data network.

75. The method of claim 74, wherein the data network is an internet.

76. A method of operating a gaming device including a plurality of instructions, said method comprising:
(a) causing at least one display device to display:
(ii) a starting value to a player; and
(ii) a plurality of selections, wherein each of the selections is associated with a numerical modifier;
(b) enabling the player to divide said starting value into a plurality of starting portions, wherein each of said starting portions is greater than zero;
(c) enabling the player to select one of said starting portions;
(d) picking one of the plurality of selections;
(e) enabling the player to individually associate said selected starting portion with said picked selection;
(f) causing at least one processor to execute the plurality of instructions to form an ending portion based on said individually associated starting portion and said numerical modifier associated with the picked selection;
(g) repeating steps (c) to (f) for at least another one of said remaining unassociated starting portions; and
(h) providing the player an award based on at least two of said ending portions.

77. The method of claim 76, which includes enabling the player to pick said selections.

78. The method of claim 76, which includes repeating steps (c) to (f) for each of a plurality of said remaining unassociated starting portions.

79. The method of claim 76, which includes repeating steps (c) to (f) for each of said remaining unassociated starting portions.

80. The method of claim 76, wherein a plurality of said numerical modifiers are different.

81. The method of claim 76, wherein said steps are provided to the player through a data network.

82. The method of claim 81, wherein the data network is an internet.

83. A method of operating a gaming device including a plurality of instructions, said method comprising:
(a) causing at least one display device to display:
(i) a starting amount to a player; and
(ii) a plurality of investment related symbols, wherein each of the investment related symbols is associated with a numerical modifier;
(b) enabling the player to divide said starting amount into a plurality of different starting portions, wherein each of said different starting portions is greater than zero;
(c) causing one of the displayed investment related symbols to be picked;
(d) enabling the player to individually associate one of said displayed starting portions with said picked investment related symbol;
(e) causing at least one processor to execute the plurality of instructions to form an investment return amount based on said individually associated starting portion and said numerical modifier associated with the picked investment related symbol;
(f) repeating steps (c) to (e) for at least another one of said remaining unassociated starting portions; and
(g) providing the player an award based on at least two of said investment return amounts.

84. The method of claim 83, which includes enabling the player to pick said investment related symbols.

85. The method of claim 83, which includes repeating steps (c) to (g) for each of a plurality of said remaining unassociated starting portions.

86. The method of claim 83, which includes repeating steps (c) to (g) for each of said remaining unassociated starting portions.

87. The method of claim 83, wherein a plurality of said numerical modifiers are different.

88. The method of claim 83, wherein said steps are provided to the player through a data network.

89. The method of claim 88, wherein the data network is an internet.

90. A method of operating a gaming device including a plurality of instructions, said method comprising:
(a) causing at least one display device to initially display:
(i) a plurality of starting values to a player, wherein each starting value is greater than zero, and at least two of said plurality of starting values being different; and
(ii) a plurality of selections, wherein for each one of the selections, a separate one of a plurality of numerical modifiers is associated with said selection;
(b) thereafter:
(i) causing a plurality of the displayed selections to be picked: and
(ii) enabling the player to individually associate a plurality of said displayed starting values with said plurality of picked selections;
(c) causing at least one processor to execute the plurality of instructions to form a plurality of ending values, wherein each ending value is based on one of said starting values and said numerical modifier associated with the picked selection which said starting value is individually associated with; and
(d) providing the player an award based on at least two of said ending values.

91. The gaming device of claim 90, which includes enabling the player to pick said plurality of selections.

92. The method of claim 90, wherein a plurality of said numerical modifiers are different.

93. The gaming device of claim 90, which includes providing the player an award based on each of said ending values.

94. The method of claim 90, wherein said steps are provided to the player through a data network.

95. The method of claim 94, wherein the data network is an internet.

96. A method of operating a gaming device including a plurality of instructions, said method comprising:

(a) causing at least one display device to display:

(i) each of a plurality starting values to a player, wherein each starting value is greater than zero; and (ii) a plurality of selections, wherein at least one of said selections is associated with a numerical modifier;

(b) enabling the player to accept at least one of said plurality of starting values or risk at least one of said starting values to obtain at least one ending value;

(c) providing the player each starting value, if any, the player accepts;

(d) for each starting value, if any, the player risks:

(i) enabling the player to individually associate said starting value with a selection picked from the plurality of selections; and (ii) causing at least one processor to execute the plurality of instructions to form an ending value based on said individually associated starting value and any numerical modifier associated with said picked selection; and (e) providing the player an award based on any formed ending values.

97. The method of claim 96, which includes enabling the player to pick said selections.

98. The method of claim 96, which includes enabling the player to accept a plurality of said starting values or risk each of said starting values to obtain a plurality of ending values.

99. The method of claim 96, wherein a plurality of said numerical modifiers are different.

100. The method of claim 96, wherein said steps are provided to the player through a data network.

101. The method of claim 100, wherein the data network is an internet.

102. A method of operating a gaming device including a plurality of instructions, said method comprising:

(a) causing at least one display device to display:

(i) a starting value to a player; and (ii) a plurality of selections, wherein at least one of said selections is associated with a numerical modifier;

(b) enabling the player to divide said starting value into a plurality of starting portions, wherein each of said starting portions is greater than zero;

(c) enabling the player to accept at least one of said plurality of starting values or risk at least one of said starting values to obtain at least one ending portion;

(d) providing the player each starting portion, if any, the player accepts;

(e) for each starting portion, if any, the player risks:

(i) enabling the player to individually associate said starting portion with a selection picked from the plurality of selections; and (ii) causing at least one processor to execute the plurality of instructions to form an ending portion based on said individually associated starting portion and any modifier associated with said picked selection; and (f) providing the player an award based on any formed ending portions.

103. The method of claim 102, wherein each of the plurality of starting portions is different.

104. The method of claim 102, which includes enabling the player to pick said selections.

105. The method of claim 102, which includes enabling the player to accept a plurality of said starting portions or risk each of said starting portions to obtain a plurality of ending portions.

106. The method of claim 102, wherein a plurality of said numerical modifiers are different.

107. The method of claim 102, wherein said steps are provided to the player through a data network.

108. The method of claim 107, wherein the data network is an internet.

109. A method of operating a gaming device including a plurality of instructions, said method comprising:

(a) causing at least one display device to display:

(i) each of a plurality of starting values to a player, wherein each starting value is greater than zero; and (ii) a plurality of selections to the player, wherein at least one of the selections is associated with a numerical modifier;

(b) enabling the player to forfeit at least one of said starting values in exchange for revealing any numerical modifier associated with at least one of the selections;

(c) revealing any numerical modifier associated with at least one of the selections for each starting value forfeited;

(d) for each starting value not forfeited:

(i) enabling a player to individually associate said starting value with a picked selection; and (ii) causing at least one processor to execute the plurality of instructions to form an ending value based on said individually associated starting value and any modifier associated with the picked selection regardless of whether said numerical modifier associated with said picked selection is revealed or not; and (e) providing the player an award based on any formed ending values.

110. The method of claim 109, which includes enabling the player to pick said selections.

111. The method of claim 109, wherein a plurality of said selections are associated with a plurality of numerical modifiers.

112. The method of claim 111, wherein a plurality of said numerical modifiers are different.

113. The method of claim 109, wherein said steps are provided to the player through a data network.

114. The method of claim 113, wherein the data network is an internet.

* * * * *

UNITED STATES PATENT AND TRADEMARK OFFICE

CERTIFICATE OF CORRECTION

PATENT NO. : 7,666,087 B2
APPLICATION NO. : 10/803309
DATED : February 23, 2010
INVENTOR(S) : Andrea C. Hughs-Baird It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1742 days.

Signed and Sealed this

Seventh Day of December, 2010

David J. Kappos

*Director of the United States Patent and Trademark Office*

UNITED STATES PATENT AND TRADEMARK OFFICE
CERTIFICATE OF CORRECTION

PATENT NO. : 7,666,087 B2
APPLICATION NO. : 10/803309
DATED : February 23, 2010
INVENTOR(S) : Hughs-Baird It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1742 days.

In Claim 6, Column 9, line 46, insert --processor-- after “said”.

In Claim 9, Column 9, line 62, replace “name” with --game--.

In Claim 9, Column 10, line 6, insert --and-- after “picked;”.

In Claim 15, Column 10, line 43, insert --and-- after “processor;”.

In Claim 15, Column 10, line 55, replace “selection” with --selections--.

In Claim 18, Column 11, line 20, insert --a-- between “(i)” and “starting”.

In Claim 25, Column 11, line 67, insert --and-- after “processor;”.

In Claim 30, Column 12, line 48, insert --and-- after “processor;”.

In Claim 34, Column 13, line 32, insert --;-- after “modifiers”.

In Claim 39, Column 14, line 1, insert --and-- after “processor;”.

In Claim 39, Column 14, line 11, insert --;-- after “modifiers”.

In Claim 44, Column 14, line 46, insert --and-- after “processor;”.

In Claim 57, Column 16, line 5, insert --;-- after “modifier”.

In Claim 91, Column 18, line 64, replace “gaming device” with --method--.

In Claim 93, Column 19, line 1, replace “game device” with --method--.

Signed and Sealed this

Twenty-first Day of December, 2010

David J. Kappos

David J. Kappos
*Director of the United States Patent and Trademark Office*